(12) United States Patent
Okumura

(10) Patent No.: US 12,365,125 B2
(45) Date of Patent: Jul. 22, 2025

(54) FLAME-RETARDANT BIAXIALLY-ORIENTED POLYESTER FILM

(71) Applicant: TOYOBO CO., LTD., Osaka (JP)

(72) Inventor: Hisao Okumura, Tokyo (JP)

(73) Assignee: TOYOBO CO., LTD., Osaka (JP)

(*) Notice: Subject to any disclaimer, the term of this patent is extended or adjusted under 35 U.S.C. 154(b) by 368 days.

(21) Appl. No.: 17/906,097

(22) PCT Filed: Mar. 8, 2021

(86) PCT No.: PCT/JP2021/008899
§ 371 (c)(1),
(2) Date: Sep. 12, 2022

(87) PCT Pub. No.: WO2021/192947
PCT Pub. Date: Sep. 30, 2021

(65) Prior Publication Data
US 2023/0173731 A1 Jun. 8, 2023

(30) Foreign Application Priority Data

Mar. 25, 2020 (JP) .................................. 2020-053641

(51) Int. Cl.
| | |
|---|---|
| *B29C 48/08* | (2019.01) |
| *B29C 48/00* | (2019.01) |
| *B29C 55/12* | (2006.01) |
| *C08G 63/183* | (2006.01) |
| *C08K 5/5313* | (2006.01) |
| *B29K 67/00* | (2006.01) |
| *B29K 105/00* | (2006.01) |
| *B29K 105/04* | (2006.01) |
| *B29L 7/00* | (2006.01) |
| *B29L 31/34* | (2006.01) |

(52) U.S. Cl.
CPC ............ *B29C 48/08* (2019.02); *B29C 48/022* (2019.02); *B29C 55/12* (2013.01); *C08G 63/183* (2013.01); *C08K 5/5313* (2013.01); *B29K 2067/003* (2013.01); *B29K 2105/0026* (2013.01); *B29K 2105/04* (2013.01); *B29K 2995/0016* (2013.01); *B29K 2995/003* (2013.01); *B29K 2995/0053* (2013.01); *B29K 2995/0097* (2013.01); *B29L 2007/00* (2013.01); *B29L 2031/3475* (2013.01)

(58) Field of Classification Search
None
See application file for complete search history.

(56) References Cited

U.S. PATENT DOCUMENTS

2016/0194466 A1* 7/2016 Nakamura ............ H05K 1/028
524/133

FOREIGN PATENT DOCUMENTS

| CN | 103261319 A | 8/2013 |
|---|---|---|
| JP | 4817729 B2 | 11/2011 |
| JP | 2014-088582 A | 5/2014 |
| JP | 5623892 B2 | 11/2014 |
| JP | 6027260 B2 | 11/2016 |
| JP | 2016-199625 A | 12/2016 |

OTHER PUBLICATIONS

China National Intellectual Property Administration, First Office Action in Chinese Patent Application No. 202180021562.2 (Apr. 20, 2023).
Japan Patent Office, International Preliminary Report on Patentability in International Patent Application No. PCT/JP2021/008899 (Sep. 22, 2022).
Korean Intellectual Property Office, Office Action in Korean Patent Application No. 10-2022-7032126 (Sep. 3, 2024).
Japanese Patent Office, International Search Report in International Patent Application No. PCT/JP2021/008899 (May 25, 2021).
Japan Patent Office, Notice of Reasons for Refusal in Japanese Patent Application No. 2022-509499 (Jan. 6, 2023).

* cited by examiner

*Primary Examiner* — Sheeba Ahmed
(74) *Attorney, Agent, or Firm* — Leydig, Voit & Mayer, Ltd.

(57) ABSTRACT

The invention provides a flame-retardant biaxially-oriented polyester film which is porous and has high reflectance. The flame-retardant biaxially-oriented polyester film contains a polymer component containing polyethylene terephthalate and a flame retardant. The polyester film has an intrinsic viscosity of 0.50 to 0.64 dL/g and a density of 1.21 to 1.27 g/cm³. A content of the polyethylene terephthalate in the polyester film is 70 to 97% by mass. The flame retardant contains at least one phosphorus-based flame retardant selected from the group consisting of a phosphinate and a diphosphinate. A content of the phosphorus-based flame retardant in the polyester film is 3 to 8% by mass. The polyester film is a porous film having an average reflectance of 60 to 74% at a wavelength of 400 to 700 nm. The polyester film has a thickness of 15 to 45 μm.

2 Claims, No Drawings

FLAME-RETARDANT BIAXIALLY-ORIENTED POLYESTER FILM

TECHNICAL FIELD

The present invention relates to a biaxially-oriented polyester film having flame retardancy, and more particularly to a biaxially-oriented polyester film having good flame retardancy and excellent light reflection characteristics even in the case of a thin film having a thickness of about 15 μm.

BACKGROUND ART

Along with high performance and low price of a light emitting diode (LED), in recent years, electronic devices incorporating an LED light source to cause a display such as advertisement or a keyboard to emit light have been widely used. Since the LED generates a large amount of heat during light emission, the LED may cause a fire when an unintended overcurrent flows, and an LED-mounted substrate and peripheral members are required to have high flame retardancy in terms of safety. Meanwhile, a member disposed on the lower surface side of the LED is required to have a high reflectance as much as possible in order to increase light utilization efficiency and increase luminance with small power consumption, and to have a characteristic of scattering reflected light in a wide angle range in order to reduce glare. However, a foam-based material having a high light reflectance has a characteristic of being easily burned, which makes it difficult to achieve both high flame retardancy and a high reflectance.

Halogen flame retardants conventionally used, such as an organohalogen compound and a halogen-containing organophosphorus compound, have high flame retardancy effect, but a possibility is pointed out that the halogen flame retardant liberates a halogen during molding or processing to generate corrosive hydrogen halide gas, causing a molding or processing apparatus to suffer corrosion or causing the working atmosphere to be poor. Further, a possibility that the halogen flame retardant generates a gas of hydrogen halide or the like when suffering burning, such as a fire, is pointed out. For this reason, recently, it is desired to use a flame retardant containing no halogen as a substitute for the halogen flame retardant.

On the other hand, a polyester film, particularly a biaxially stretched film using polyethylene terephthalate or polyethylene naphthalate has excellent mechanical properties and excellent heat resistance as well as excellent chemical resistance, and therefore has been widely used as a material for magnetic tapes, photographic films, packaging films, films for electronic components, electrical insulating films, films for laminating metals, protective films, and the like. Since a polyester film has particularly high heat resistance, a polyester film is suitably used for a mounting substrate of an LED chip or an application in which a polyester film is directly bonded to the mounting substrate.

As one method for imparting flame retardancy to the polyester film, a method for copolymerizing a phosphorus compound with a polyester has been proposed. For example, Patent Document 1 discloses that by copolymerizing a specific carboxyphosphinic acid compound, high flame retardancy can be imparted with a small amount of the compound without using other phosphorus compounds in combination.

However, when the carboxyphosphinic acid compound described in Patent Document 1 is copolymerized, the crystallization of a polyester is inhibited to cause lowered heat resistance, and thus such a compound is not suitable for applications used at high temperatures such as LED substrates. The flame retardancy provided by the copolymerization makes the film transparent, and does not have a function of reflecting light. Therefore, it is necessary to contain a white pigment such as titanium oxide at a high concentration, which causes problems such as an increase in production cost and deterioration in film physical properties.

Meanwhile, Patent Document 2 discloses a technique for imparting flame retardancy by dispersing phosphinic acid metal salt particles in a polyester. A base resin is a homopolymer, which causes no problem of reduction in heat resistance as in a copolymer. The problem of reduction in strength due to particle incorporation is solved by finely pulverizing particles. Fine voids are generated in a stretching step with flame retardant particles as a nucleating agent, and thus the technique of Patent Document 2 is also excellent in light reflectance. From this, it can be said that a film in which such phosphorus-based flame retardant particles are dispersed is more suitable as the LED substrate and the light reflecting member.

PRIOR ART DOCUMENT

Patent Documents

Patent Document 1: JP-B-4817729
Patent Document 2: JP-B-6027260

SUMMARY OF THE INVENTION

Problems to be Solved by the Invention

In recent years, electronic devices have been increasingly reduced in size and thickness, and members to be mounted are also required to be as thin and light as possible. Usually, a thick film of 200 to 300 μm is used as a white reflective film used for a liquid crystal display or the like, but in the case of applications in which a slight difference in luminance is not so important, such as advertisement, a pilot lamp, and a light-emitting keyboard, priority is given to thinness.

Also from the viewpoint of global environmental conservation, there is an increasing demand for thin films with a small amount of materials to be used. Incidentally, in general, in the VTM test of UL-94 standard, it is known that a thinner film makes it difficult to satisfy the flame retardance standard. This is considered to be due to entanglement of a plurality of factors such as deformation of the sample or change of the drip state during the combustion test when the film is thin, but the detailed mechanism is not well known. In particular, in the case of the porous film described in Patent Document 2, it has been found that when the film thickness is less than 50 μm, the probability of satisfying the flame retardance standard greatly decreases, and a thin film of about 25 μm disadvantageously has no stable flame retardancy.

An object of the present invention is to provide a flame-retardant biaxially-oriented polyester film which is a porous film having a high reflectance, is also applicable as an LED reflective film, and can reproduce stable flame retardancy even in the case of a thin film having a thickness of 45 μm or less.

Means for Solving the Problems

As a result of intensive studies to solve the above problems, the present inventors have found that there is a good correlation between specific film properties and flame retardancy, and have found that even a thin film having a thickness of 45 μm or less can achieve both good flame retardancy and good optical characteristics by controlling the film properties within a predetermined range, thereby completing the present invention.

That is, the invention relates to a flame-retardant biaxially-oriented polyester film comprising:
a polymer component containing polyethylene terephthalate; and
a flame retardant,
wherein
the polyester film has an intrinsic viscosity of 0.50 to 0.64 dL/g and a density of 1.21 to 1.27 g/cm³,
a content of the polyethylene terephthalate in the polyester film is 70 to 97% by mass,
the flame retardant contains at least one phosphorus-based flame retardant selected from the group consisting of a phosphinate represented by general formula (1) below and a diphosphinate represented by general formula (2) below,
a content of the phosphorus-based flame retardant in the polyester film is 3 to 8% by mass,
the polyester film is a porous film having an average reflectance of 60 to 74% at a wavelength of 400 to 700 nm, and
the polyester film has a thickness of 15 to 45 μm:

[Formula 1]

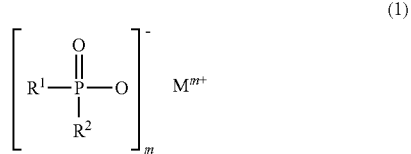

(1)

wherein $R^1$ and $R^2$ are each independently hydrogen, an alkyl group having 1 to 6 carbon atoms, or an aryl group, M represents a metal, and m represents a valence of M, and

[Formula 2]

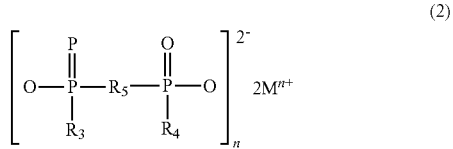

(2)

wherein $R^3$ and $R^4$ each independently represent hydrogen, an alkyl group having 1 to 6 carbon atoms, or an aryl group, $R^5$ represents an alkylene group having 1 to 6 carbon atoms, an arylene group having 6 to 10 carbon atoms, an alkylarylene group, or an arylalkylene group, M represents a metal, and n represents a valence of M.

In the flame-retardant biaxially-oriented polyester film of the present invention, the flame-retardant biaxially-oriented polyester film preferably has a half-value width of 32.0 to 35.0 at −45 to 45 degrees as measured with a variable angle photometer.

The present invention also relates to a reflective film comprising the flame-retardant biaxially-oriented polyester film of the present invention.

Effect of the Invention

The present inventor has found that there is a correlation between the intrinsic viscosity of the polyester film and the results of the VTM combustion test, and by optimizing the intrinsic viscosity (intrinsic viscosity measured at 35° C. using o-chlorophenol as a solvent) of the polyester film to 0.50 to 0.64 dL/g, good flame retardancy can be obtained even in a thin film having a thickness of 45 μm or less. Specifically, when the intrinsic viscosity of the polyester film is less than 0.50 dL/g, the probability of reaching the marked line of the sample (polyester film) in the VTM combustion test increases. Conversely, when the intrinsic viscosity of the polyester film exceeds 0.64 dL/g, the probability of cotton ignition increases. The reason for this is not clear, but generally presumed to be due to the following mechanism. That is, when the intrinsic viscosity of the polyester film is low and the melt viscosity is low, the sample is melted and dripped before being ignited by the flame contact of the burner. Since the mass of the sample is rapidly lost by the dripping, the combustion end is likely to reach the marked line. Conversely, when the intrinsic viscosity of the polyester film is high and the melt viscosity is high, the dripping is less likely to occur, so that the ignition of the sample precedes. In addition, the sample burns for a relatively long time, and drips after the flame becomes large, so that the cotton ignition is likely to occur. However, since the dripping is less likely to occur, the sample is not consumed, which makes it difficult to reach the marked line. Therefore, when the intrinsic viscosity of the polyester film is 0.50 to 0.64 dL/g, the dripping can be suppressed, and the cotton ignition is less likely to occur, so that good flame retardancy is obtained.

There is a proportional relationship between the reflectance and the film density, and as the reflectance increases, a void ratio increases and the film density decreases. When the average reflectance of the biaxially-oriented polyester film at a wavelength of 400 to 700 nm is 74% or less, the formation of char is less likely to be inhibited by voids, so that good flame retardancy is obtained. When the average reflectance is 60 or more, the film effectively functions as a reflective film.

As described above, the flame-retardant biaxially-oriented polyester film of the present invention is a porous film having a high reflectance, can achieve both good flame retardancy and good optical characteristics even in a thin film having a thickness of 45 μm or less, and is suitably used as an LED reflective film.

MODE FOR CARRYING OUT THE INVENTION

Hereinafter, the present invention will be described in detail.
<Flame-Retardant Biaxially-Oriented Polyester Film>
A flame-retardant biaxially-oriented polyester film (hereinafter, also simply referred to as a "polyester film") of the present invention contains at least a polymer component containing polyethylene terephthalate and a flame retardant.
(Polymer Component Containing Polyethylene Terephthalate)
The polyethylene terephthalate in the present invention may be a copolymer having a component other than the main component (hereinafter, referred to as a "copolymer component") in such an amount that the effects aimed at by the present invention are not sacrificed. The copolymer component can be used preferably in an amount of less than 25 mol %, more preferably 20 mol % or less, further preferably 10 mol % or less, based on the mole of the all repeating units of the polyethylene terephthalate. When the copolymerization ratio exceeds this range, the crystallinity of the polyester film decreases, and thus sufficient heat resistance cannot be obtained.

Examples of the copolymer components include dicarboxylic acids, such as oxalic acid, adipic acid, phthalic acid, sebacic acid, dodecanedicarboxylic acid, isophthalic acid, terephthalic acid, 1,4-cyclohexanedicarboxylic acid, 4,4'-diphenyldicarboxylic acid, phenylindandicarboxylic acid, 2,6-naphthalenedicarboxylic acid, 2,7-naphthalenedicarboxylic acid, tetralindicarboxylic acid, decalindicarboxylic acid, and diphenyl ether dicarboxylic acid; oxycarboxylic acids, such as p-oxybenzoic acid and p-oxyethoxybenzoic acid; and diols, such as ethylene glycol, trimethylene glycol, tetramethylene glycol, hexamethylene glycol, cyclohexanedimethanol, neopentyl glycol, an ethylene oxide addition product of bisphenol sulfone, an ethylene oxide addition product of bisphenol A, diethylene glycol, and polyethylene oxide glycol. These copolymer components may be used individually or in combination. The copolymer component may be one which is incorporated as a monomer component and copolymerized, or may be one which is copolymerized by a transesterification reaction with another polyester.

Further, the polyethylene terephthalate may be a blend of at least two types of polyesters in such a range that the effects aimed at by the present invention are not sacrificed. The polymer component may contain a thermoplastic resin other than polyethylene terephthalate or polyethylene naphthalate. Examples of thermoplastic resins include polyolefin resins, polystyrene resins, and polyimide resins. The polymer component other than polyethylene terephthalate can be preferably used in an amount of 20% by mass or less, more preferably 15% by mass or less, still more preferably 10% by mass or less, further preferably 5% by mass or less, based on the mass of the polyester film.

The polyester film of the present invention contains 70 to 97% by mass of polyethylene terephthalate. The content of the polyethylene terephthalate is preferably 75% by mass or more, more preferably 80% by mass or more, and still more preferably 90% by mass or more, and is preferably 95% by mass or less, and more preferably 92% by mass or less. When the content of the polyethylene terephthalate is less than 70% by mass, heat resistance and mechanical strength are reduced. Meanwhile, when the content of the polyethylene terephthalate exceeds 97% by mass, the content of the flame retardant is relatively low, so that sufficient flame retardancy is not exhibited.

(Flame Retardant)

The flame retardant contains at least one phosphorus-based flame retardant selected from the group consisting of a phosphinate represented by general formula (1) below and a diphosphinate represented by general formula (2) below.

[Formula 3]

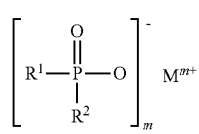

(1)

wherein $R^1$ and $R^2$ are each independently hydrogen, an alkyl group having 1 to 6 carbon atoms, or an aryl group, M represents a metal, and m represents a valence of M, and

[Formula 4]

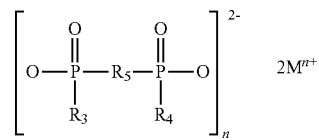

(2)

wherein $R^3$ and $R^4$ each independently represent hydrogen, an alkyl group having 1 to 6 carbon atoms, or an aryl group, $R^5$ represents an alkylene group having 1 to 6 carbon atoms, an arylene group having 6 to 10 carbon atoms, an alkylarylene group, or an arylalkylene group, M represents a metal, and n represents a valence of M.

The phosphinate is a compound also called a metal phosphinate, and examples of $R^1$ and $R^2$ include hydrogen, a methyl group, an ethyl group, a n-propyl group, an isopropyl group, a n-butyl group, a t-butyl group, a pentyl group, a hexyl group, and a phenyl group. Examples of M include aluminum, magnesium, and calcium, and valence m is an integer of 2 to 4.

Examples of the phosphinate include calcium dimethylphosphinate, calcium methylethylphosphinate, calcium diethylphosphinate, calcium phenylphosphinate, calcium biphenylphosphinate, magnesium dimethylphosphinate, magnesium methylethylphosphinate, magnesium diethylphosphinate, magnesium phenylphosphinate, magnesium biphenylphosphinate, aluminum dimethylphosphinate, aluminum methylethylphosphinate, aluminum diethylphosphinate, aluminum phenylphosphinate, aluminum biphenylphosphinate, or the like.

In the diphosphinate, examples of $R^3$ and $R^4$ include hydrogen, a methyl group, an ethyl group, a n-propyl group, an isopropyl group, a n-butyl group, a t-butyl group, a pentyl group, a hexyl group, and a phenyl group, and examples of $R^5$ include a methylene group, an ethylene group, a propylene group, a butylene group, a pentylene group, a hexylene group, and a phenylene group. Examples of M include aluminum, magnesium, and calcium, and valence n is an integer of 2 to 4.

Examples of diphosphinates include calcium alkanebisphosphinate, such as calcium ethane-1,2-bis(phosphinate), calcium alkanebis(alkylphosphinate), such as calcium ethane-1,2-bis(methylphosphinate), magnesium alkanebisphosphinate, magnesium alkanebis(alkylphosphinate), aluminum alkanebisphosphinate, and aluminum alkanebis(alkylphosphinate) or the like.

Of these phosphorus-based flame retardants, aluminum diethylphosphinate is especially preferred.

The content of the phosphorus-based flame retardants is 3 to 8% by mass in the polyester film. The content of the phosphorus-based flame retardants is preferably 4% by mass or more, more preferably 5% by mass or more, and preferably 7% by mass or less, more preferably 6% by mass or less. When the content of the phosphorus-based flame retardant is less than 3% by mass, the flame retardancy is not sufficient. Meanwhile, when the content of the phosphorus-based flame retardant exceeds 8% by mass, the flame retardancy is conversely reduced. This is considered to be because voids in the polyester film increase to suppress the formation of char necessary for flame retardancy, and the IV of the polyester film decreases to increase the drip amount as described later.

The average particle diameter of the phosphorus-based flame retardant is not particularly limited, but is preferably 0.1 to 35 µm, more preferably 0.5 to 20 µm, and still more preferably 1 to 10 µm. When the average particle diameter is less than 0.1 µm, the handleability during film formation is reduced. Meanwhile, when the average particle diameter exceeds 35 µm, the film strength is reduced or the film is apt to be broken.

The polyester film of the present invention may contain a flame retardant other than the phosphorus-based flame retardant as long as the effect of the present invention is not impaired.

(Other Additives)

In the polyester film of the present invention, for improving the handling properties of the film, inert particles or the like may be added as long as the effect of the present invention is not impaired. Examples of such inert particles include inorganic particles containing an element belonging to Group IIA, IIB, IVA, or IVB of the Periodic Table (e.g., kaolin, alumina, titanium oxide, calcium carbonate, and silicon dioxide), and particles made of a polymer having a high heat resistance, such as crosslinked silicone resin, crosslinked polystyrene, or crosslinked acrylic resin particles.

When the polyester film contains inert particles, the inert particles preferably have an average particle diameter of 0.001 to 5 µm. The content of the inert particles is preferably 0.01 to 10% by mass, further preferably 0.05 to 5% by mass, still more preferably 0.05 to 3% by mass based on the mass of the polyester film. The addition of inert particles exceeding 10% by mass greatly affects the formation of voids, which is not preferable.

In the polyester film of the present invention, further, if necessary, an additive, such as a heat stabilizer, an antioxidant, an ultraviolet light absorber, a release agent, a colorant, or an antistatic agent, can be incorporated in such an amount that the effects aimed at by the invention are not sacrificed.

(Intrinsic Viscosity)

The polyester film of the present invention has an intrinsic viscosity (intrinsic viscosity measured at 35° C. using o-chlorophenol as a solvent) of 0.50 to 0.64 dL/g from the viewpoint of suppressing dripping, and being less likely to cause cotton ignition to obtain good flame retardancy. The intrinsic viscosity is preferably 0.53 dL/g or more, and more preferably 0.55 dL/g or more, and is preferably 0.62 dL/g or less, and more preferably 0.60 dL/g or less. The intrinsic viscosity can be adjusted to a desired range by appropriately adjusting the blending amount of polyethylene terephthalate or other polymer components, or by introducing water vapor into a raw material composition when a polyester film is produced.

(Thickness)

The polyester film of the present invention has a thickness of 15 to 45 µm, preferably 20 to 40 µm, more preferably 25 to 38 µm. When the film thickness is less than 15 µm, stable flame retardancy is not obtained even if the physical properties are adjusted to the range of the present invention. Meanwhile, when the film thickness exceeds 45 µm, the thickness of the component increases, which causes difficult design, and the amount of a resin per area increases, which is not preferable from the viewpoint of production cost.

(Density)

The density of the polyester film of the present invention is 1.21 to 1.27 g/cm$^3$. The density is preferably 1.22 g/cm$^3$ or more, and more preferably 1.23 g/cm$^3$ or more, and preferably 1.26 g/cm$^3$ or less, and more preferably 1.25 g/cm$^3$ or less. As with the intrinsic viscosity, the film density also greatly affects the flame retardancy of the polyester film. That is, when the film density is less than 1.21 g/cm$^3$, the combustibility increases, and thus the probability that the flame retardance standard is not satisfied increases. Although the reason for this is not clear, the following mechanism hypothesis can be considered. In general, as the flame retardant mechanism of an organic substance due to a phosphorus-based flame retardant, a phosphorus atom and carbon are bonded by combustion heat to form a carbonized film called char, and the function of the char contains combustion gas and blocks the supply of oxygen to suppress continuous combustion. When the film density is low, that is, when the void volume ratio in the film is high, it is considered that a part of the carbonized film is lost due to voids, so that the containment of the combustion gas becomes insufficient, and oxygen supply from the voids continues, so that the film is apt to burn. From this mechanism, as the film density is higher, the flame retardancy is higher, which is also supported by the experiment conducted by the inventor. Meanwhile, certain voids are essential in order to exhibit the light reflecting function of the LED, and when the film density exceeds 1.27 g/cm$^3$, a sufficient reflectance cannot be obtained.

(Reflectance)

The polyester film of the present invention is a porous film having an average reflectance of 60 to 74% at a wavelength of 400 to 700 nm. The average reflectance is preferably 62% or more, and more preferably 65% or more, and preferably 73% or less, and more preferably 70% or less. There is a proportional relationship between the reflectance and the film density, and as the reflectance increases, a void ratio increases and the film density decreases. When the average reflectance exceeds 74%, the formation of char is inhibited by voids as described above to cause lowered flame retardancy. In the case of a member having an LED reflection function, the reflectance naturally has a lower limit value, and the average reflectance that provides an effective function as a reflective film is 60% or more.

(Light Diffusibility)

The polyester film of the present invention has a half-value width of 32.0 to 35.0 at −45 to 45 degrees as measured with a variable angle photometer. The half-value width is preferably 32.5 or more, and more preferably 33.0 or more, and is preferably 34.5 or less, and more preferably 34.0 or less. In a case where the half-value width is more than 35.0, the front luminance becomes too small, which is not preferable. Meanwhile, in a case where the half-value width is smaller than 32.0, the light diffusibility is insufficient, so that the number of LEDs needs to be increased, or the substrate size needs to be increased in order to widen the arrangement interval of light sources, which is not preferable.

<Method for Producing Flame-Retardant Biaxially-Oriented Polyester Film>

The polyester film of the present invention can be produced using a known film forming method, and for example, a raw material composition containing at least a polymer component and a flame retardant is sufficiently dried, then melted in an extruder at a temperature of a melting point of the polymer component to (melting point+70)° C., and melt-extruded through a T-die. At this time, the intrinsic viscosity of the polyester film can be adjusted by introducing a small amount of water vapor into a raw material supply system including a supply hopper of the extruder. The intrinsic viscosity of the polyester film can be adjusted by adjusting the intrinsic viscosity of the polymer component to an appropriate range or changing the mixing ratio of the recovered raw materials. The film-shaped melt extruded from the T-die is rapidly cooled on a cooling roll (casting drum) to obtain an un-stretched film. Then, the un-stretched film is subjected to successive or simultaneous biaxial stretching, followed by heat setting, whereby the film can be produced.

When a film is formed by successive biaxial stretching, the un-stretched film is preheated to preferably 60 to 130° C. and stretched in the longitudinal direction preferably 2.0 to 4.0 times, more preferably 2.5 to 3.5 times, and still more preferably 2.6 to 3.2 times. There are a plurality of means for adjusting the film density, but adjustment at a longitudinal stretching ratio is most simple and accurate, and has little influence on other physical properties, which is preferable. The film is then stretched in the transverse direction by a stenter, preferably at 80 to 170° C., preferably 2.3 to 5.0 times, and more preferably 2.5 to 4.0 times.

The heat set treatment is preferably heat setting which is conducted under stress or limit shrink at a temperature of 180 to 260° C., more preferably 190 to 240° C., and the heat set time is preferably 1 to 1,000 seconds. In the case of simultaneous biaxial stretching, the above-mentioned stretch temperature, stretch ratio, heat set temperature, and the like can be used. Further, after heat setting, the resultant film may be subjected to relaxation treatment.

<Led Reflector>

The polyester film of the present invention can be suitably used as a reflecting member (reflective film) of a backlight unit having an LED light source. When used in such an application, a black or highly opacifying white coating material can be applied to the back surface of a light reflecting surface of the polyester film to prevent light leakage to the outside of backlight. The light reflecting surface can also be coated with diffusion particles such as glass beads in order to further have light diffusibility. Furthermore, an optical member such as a light guide plate or a diffusion plate may be laminated on the front surface side of the reflective film.

In the LED reflective film using the polyester film of the present invention, the polyester film itself has high flame retardancy, which is less likely to induce fire spreading even in light source overheating, and has a high reflectance and high diffusibility, so that a wide range can be illuminated with a relatively small number of LED light sources.

EXAMPLES

Hereinafter, the present invention will be more specifically described with reference to Examples and Comparative Examples, but the present invention is not limited to the following Examples. The evaluation methods of physical properties and the like in the following Examples are as follows.

(1) Intrinsic Viscosity

After 0.6 g of the produced polyester film was dissolved in 50 ml of o-chlorophenol by heating, the solution was once cooled, and an insoluble matter was removed by a centrifuge. An Intrinsic viscosity of the solution was calculated from a solution viscosity measured at 35° C. using an Ostwald-type viscosity tube. For the intrinsic viscosity, a resin content was converted using the following formula.

Intrinsic viscosity (dL/g)=Measured value/{(100−Phosphorus-based flame retardant concentration)/100}

(2) Film Density

The produced polyester film was cut into a size of 10 cm×10 cm, the thicknesses of the film were measured at 10 optional points with an electric micrometer (K-402B manufactured by Anritsu corporation, tip shape of head measurer: spherical shape having a diameter of 6 mm), and the average value thereof was taken as the thickness of the film. The weight of the film was measured. The density of the film was calculated from the thickness average value of the film and the weight of the film.

(3) Average Particle Diameter

In the cross section of the produced polyester film, particle diameters of 20 phosphorus-based flame retardant particles were measured at a magnification of 3500 using a digital microscope KH-3000 manufactured by Hirox Co., Ltd., and the average particle diameter of the phosphorus-based flame retardant was determined from the average value.

(4) Reflectance

An integrating sphere was attached to a spectrophotometer (UV-3101PC manufactured by Shimadzu Corporation), and the reflectance of the surface of the polyester film was measured at 400 to 700 nm with a $BaSO_4$ white plate taken as 100%. The average reflectance at a film thickness of 25 µm was determined from the average value.

(5) Degree of Light Diffusion

Using a variable angle photometer (Gonio Photometer GP-200 manufactured by Murakami Color Research Laboratory), an optical filter ND1 and a 42 L filter were inserted, and incident on a polyester film at 75°. Light was received at a light receiving angle of 20 to 85°, and a half-value width at −45 to 45 degrees was measured.

(6) Combustibility

The produced polyester film sample was evaluated in accordance with the UL-94 VTM method. The produced polyester film was cut into 20 cm×5 cm, and a marked line was then drawn at a position of 125 mm from the lower end. The film was wound around a metal rod having a diameter of 12.9 mm to form a cylindrical shape, and fixed with an adhesive tape to prepare a sample. This sample was left standing in 23±2° C., 50±5% RH for 48 hours, and the lower end of the sample was then held vertically away from a burner by 10 mm. 0.8 g of absorbent cotton stored under an atmosphere with a humidity of 50% was weighed and placed immediately below the sample. The lower end of the sample was brought into contact with flame of a Bunsen burner having an inner diameter of 9.5 mm and a flame length of 19 mm as a heating source twice for 3 seconds. A combustion test was performed with n=5, and the presence or absence of ignition of the absorbent cotton and whether or not the lower end of combustion reached the marked line were recorded. The combustibility was determined according to the following criteria.

Good: No cotton ignition and reaching of marked line
Average: Only at one point, cotton ignition or reaching of marked line
Poor: At two or more points, cotton ignition or reaching of marked line
(A case of cotton ignition and reaching of marked line in the same sample was counted as two points.)

Example 1

20 parts by mass of aluminum dimethylphosphinate (average particle diameter: 2 µm) was previously melt-kneaded with 80 parts by mass of polyethylene terephthalate having an intrinsic viscosity of 0.68 dL/g to prepare a master batch. The intrinsic viscosity of the masterbatch in terms of a net resin amount was 0.48 dL/g.

A raw material composition obtained by mixing 75 parts by mass of polyethylene terephthalate (ethylene terephthalate component: 100%) having an intrinsic viscosity of 0.78 dL/g and 25 parts by mass of the masterbatch was dried with a dryer at 170° C. for 3 hours, and then supplied to a resin hopper into which water vapor of 0.5 g/min was blown, so that a predetermined amount of moisture was absorbed in the raw material composition. Thereafter, the raw material composition was charged into an extruder, melt-kneaded at a melting temperature of 280° C., extruded through a die slit at 280° C., and then cooled and solidified on a casting drum set at a surface temperature of 25° C. to prepare an un-stretched film. This un-stretched film was guided to a roll group heated to 100° C., stretched 3.0 times in a machine direction (longitudinal direction) on an infrared heater red-heated to a surface temperature of about 650° C., and cooled by the roll group at 25° C. Subsequently, the longitudinally stretched film was guided to a tenter while both ends thereof were held by clips, and stretched 3.4 times in a direction perpendicular to the machine direction (transverse direction) in an atmosphere heated to 120° C. Thereafter, heat setting was performed at 230° C. in the tenter, and the film was relaxed by 2% in the transverse direction at 180° C. The film was uniformly cooled slowly to room temperature to obtain a biaxially stretched polyester film having a thickness of 25 μm. The physical properties of the obtained polyester film are shown in Table 1. The polyester film had good combustibility, degree of light diffusion, and brightness when the LED light source was reflected.

Example 2

A biaxially stretched polyester film having a thickness of 25 μm was obtained in the same manner as in Example 1 except that a stretching rate in a machine direction was 2.6. The physical properties of the obtained polyester film are shown in Table 1. The polyester film had good combustibility, degree of light diffusion, and brightness when the LED light source was reflected.

Example 3

A biaxially stretched polyester film having a thickness of 25 μm was obtained in the same manner as in Example 1 except that a stretching rate in a machine direction was 3.2. The physical properties of the obtained polyester film are shown in Table 1. The polyester film had good degree of light diffusion and brightness when the LED light source was reflected. The combustibility was slightly inferior to that in Example 1.

Example 4

A biaxially stretched polyester film having a thickness of 25 μm was obtained in the same manner as in Example 1 except that the amount of water supplied to a resin hopper was 0.3 g/min. The physical properties of the obtained polyester film are shown in Table 1. The polyester film had good combustibility, degree of light diffusion, and brightness when the LED light source was reflected.

Example 5

A biaxially stretched polyester film having a thickness of 25 μm was obtained in the same manner as in Example 1 except that the amount of water supplied to a resin hopper was 0.7 g/min. The physical properties of the obtained polyester film are shown in Table 1. The polyester film had good degree of light diffusion and brightness when the LED light source was reflected. The combustibility was slightly inferior to that in Example 1.

Comparative Example 1

A biaxially stretched polyester film having a thickness of 25 μm was obtained in the same manner as in Example 1 except that a stretching rate in a machine direction was 3.4. The physical properties of the obtained polyester film are shown in Table 1. The optical characteristics were good, but the combustibility was poor.

Comparative Example 2

A biaxially stretched polyester film having a thickness of 25 μm was obtained in the same manner as in Example 1 except that a stretching rate in a machine direction was 2.4. The physical properties of the obtained polyester film are shown in Table 1. The combustibility was equivalent to that of Example 3, but the brightness when incorporated into the LED light source was insufficient, and the degree of light diffusion was also poor.

Comparative Example 3

A biaxially stretched polyester film having a thickness of 25 μm was obtained in the same manner as in Example 1 except that water vapor was not supplied to a resin hopper. The physical properties of the obtained polyester film are shown in Table 1. The optical characteristics were good, but the combustibility was poor.

Comparative Example 4

A biaxially stretched polyester film having a thickness of 25 μm was obtained in the same manner as in Example 1 except that the amount of water supplied to a resin hopper was 1.0 g/min. The physical properties of the obtained polyester film are shown in Table 1. The optical characteristics were good, but the combustibility was poor.

TABLE 1

| | Amount of water supplied | Longitudinal stretching ratio | Intrinsic viscosity | Density | Reflectance | Degree of light diffusion | Combustibility |
|---|---|---|---|---|---|---|---|
| Unit | g/min | Times | dL/g | g/cm$^3$ | % | Half-value width | |
| Example 1 | 0.5 | 3.0 | 0.58 | 1.22 | 68 | 33.3 | Good |
| Example 2 | 0.5 | 2.6 | 0.58 | 1.27 | 63 | 34.4 | Good |
| Example 3 | 0.5 | 3.2 | 0.58 | 1.21 | 70 | 32.9 | Average |
| Example 4 | 0.3 | 3.0 | 0.61 | 1.22 | 68 | 33.3 | Good |

TABLE 1-continued

| | Item | | | | | | |
|---|---|---|---|---|---|---|---|
| | Amount of water supplied | Longitudinal stretching ratio | Intrinsic viscosity | Density | Reflectance | Degree of light diffusion | |
| | | | | Unit | | | |
| | g/min | Times | dL/g | g/cm$^3$ | % | Half-value width | Combustibility |
| Example 5 | 0.7 | 3.0 | 0.54 | 1.22 | 68 | 33.3 | Average |
| Comparative Example 1 | 0.5 | 3.4 | 0.58 | 1.20 | 74 | 32.0 | Poor |
| Comparative Example 2 | 0.5 | 2.4 | 0.58 | 1.28 | 59 | 35.3 | Average |
| Comparative Example 3 | 0.0 | 3.0 | 0.65 | 1.23 | 70 | 32.9 | Poor |
| Comparative Example 4 | 1.0 | 3.0 | 0.49 | 1.22 | 69 | 33.1 | Poor |

INDUSTRIAL APPLICABILITY

Since the flame-retardant biaxially-oriented polyester film of the present invention has excellent flame retardancy, mechanical properties, heat resistance, and chemical resistance, the flame-retardant biaxially-oriented polyester film is widely used as a material for magnetic tapes, photographic films, packaging films, films for electronic components, electrical insulating films, films for laminating metals, and protective films and the like. In particular, the flame-retardant biaxially-oriented polyester film of the present invention is suitably used as an LED reflective film.

The invention claimed is:

1. A reflective film comprising a flame-retardant biaxially-oriented polyester film comprising:

a polymer component containing polyethylene terephthalate; and a flame retardant, wherein the polyester film has an intrinsic viscosity of 0.50 to 0.64 dL/g and a density of 1.21 to 1.27 g/cm$^3$, a content of the polyethylene terephthalate in the polyester film is 70 to 97% by mass, the flame retardant contains at least one phosphorus-based flame retardant selected from the group consisting of a phosphinate represented by general formula (1) below and a diphosphinate represented by general formula (2) below, a content of the phosphorus-based flame retardant in the polyester film is 3 to 8% by mass, the polyester film is a porous film having an average reflectance of 60 to 74% at a wavelength of 400 to 700 nm, and the polyester film has a thickness of 15 to 45 μm:

[Formula 1]

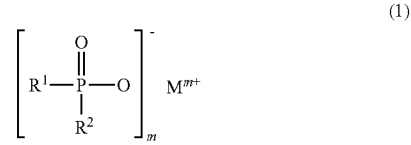

(1)

wherein $R^1$ and $R^2$ are each independently hydrogen, an alkyl group having 1 to 6 carbon atoms, or an aryl group, M represents a metal, and m represents a valence of M, and

[Formula 2]

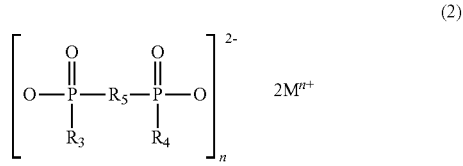

(2)

wherein $R^3$ and $R^4$ each independently represent hydrogen, an alkyl group having 1 to 6 carbon atoms, or an aryl group, $R^5$ represents an alkylene group having 1 to 6 carbon atoms, an arylene group having 6 to 10 carbon atoms, an alkylarylene group, or an arylalkylene group, M represents a metal, and n represents a valence of M.

2. The reflective film according to claim 1, wherein the flame-retardant biaxially-oriented polyester film has a half-value width of 32.0 to 35.0 at −45 to 45 degrees as measured with a variable angle photometer.

* * * * *